Patented Aug. 4, 1953

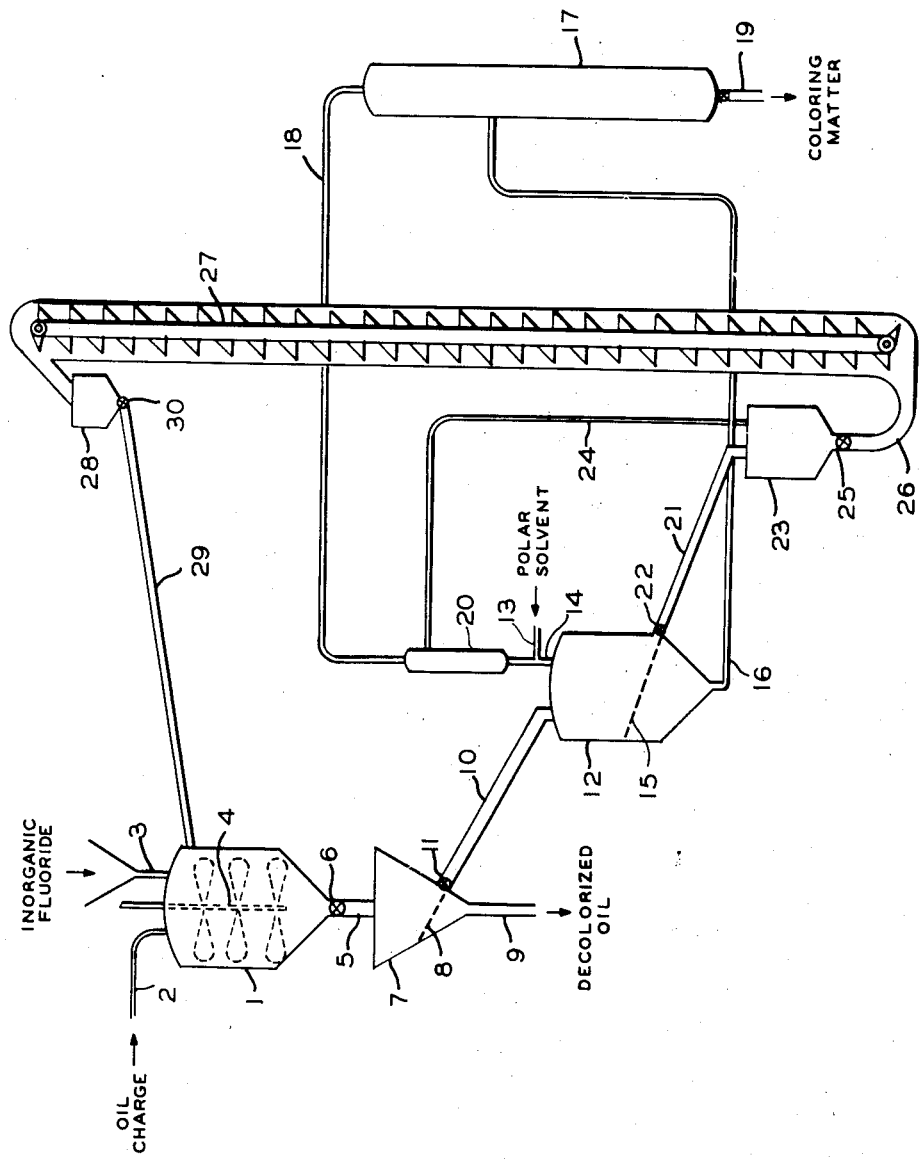

2,647,858

UNITED STATES PATENT OFFICE 2,647,858

OIL DECOLORIZATION METHOD

Paul B. Weisz, Pitman, N. J., assignor to Socony-Vacuum Oil Company, Incorporated, a corporation of New York Application August 23, 1950, Serial No. 180,951

10 Claims. (Cl. 196—44)

The instant invention relates to the refining of oils and other fluids. More particularly, the present invention is concerned with a method for decolorizing petroleum lubricating oils by contacting the same with a solid water-insoluble inorganic metal fluoride.

The coloring matter of petroleum oils, more particularly lubricating oils, is due mainly to the presence of substances of a bituminous or asphaltic nature, as well as to the presence of various complex sulfur and nitrogen compounds. In addition to these substances, coloring also is very probably due to various colloidal and dissolved impurities, such as finely divided and colloidal carbon, complex tarry compounds of high molecular weight, and the like.

The removal of substances producing color in a petroleum oil is generally understood to be dependent upon the phenomena known as adsorption. However, when a decolorizing agent is introduced into a petroleum oil, there also takes place certain changes in the oil itself that are of a chemical nature, such as polymerization of tarry, asphaltic and bituminous substances, unsaturated hydrocarbons, etc. The adsorbent, therefore, in many instances also behaves as a polymerizing agent.

The effectiveness of oil refining operations employing adsorbent materials accordingly depends upon the characteristics and properties of the adsorbent materials used. An ever present problem in the art is to develop improved adsorbents in order to obtain higher decolorization efficiency and increased commercial value in these operations. In one method for the decolorization of lubricating oils, the oil to be decolorized is agitated with a finely divided solid adsorbent material for a suitable period of time, followed by separation of the decolorized oil from the spent adsorbent mass. This contact method for decolorization of petroleum lubricating oils requires an active adsorbent in finely divided form which will not unduly affect desired properties of the lubricating oils so treated.

It is an object of this invention to provide a process for decolorizing petroleum oils by contacting the same with an active adsorbent material having the aforesaid characteristics. A further object is the provision of an oil decolorizing method which is rapid and efficient, readily lending itself to commercial operation. A still further object of this invention is the provision of a process for decolorizing oil utilizing an adsorbent material capable of easy regeneration. A very important object of this invention is to provide a continuous cyclic process for decolorizing oils with an adsorbent of high color sorption capacity.

These and other objects, which will be apparent to those skilled in the art, are attained in accordance with the present invention wherein solid, finely divided water-insoluble inorganic metal fluorides have been found to possess excellent capacity for sorbing color bodies from hydrocarbon oils. It has further been discovered that color bodies thus sorbed can be effectively removed by elutriation with a polar organic solvent and the color sorption capacity of the inorganic metal fluoride can thus be regenerated.

Broadly, the present process comprises contacting the oil to be decolorized with a finely divided solid water-insoluble metal fluoride for a suitable period of time and subsequently separating the decolorized oil from the spent fluoride particles by filtration or other feasible means. The fluoride containing sorbed color bodies may then be regenerated by elutriation of the spent fluoride with an organic polar solvent. After drying to remove solvent therefrom, the fluoride is again ready for use. In some instances where the dried regenerated fluoride has tended to form lumps or aggregates of a size greater than that desired, it is suitably ground to requisite particle size before being re-used.

The adsorbent employed in the present process is a solid inorganic metal fluoride characterized by substantial water insolubility, large effective surface area, and ionic structure, i. e., having an electrostatic or ionic type of linkage. Suitable metal fluorides useful as adsorbents in the instant process, when in the form of a finely divided powder, include lithium fluoride (LiF), cerium fluoride (CeF$_3$), chromium fluoride (CrF$_3$), nickel fluoride (NiF$_2$), lead fluoride (PbF$_2$), cuprous fluoride (Cu$_2$F$_2$), barium fluoride (BaF$_2$), manganous fluoride (MnF$_2$), strontium fluoride (SrF$_2$), vanadium trifluoride (VF$_3$), calcium fluoride (CaF$_2$), thorium fluoride (ThF$_4$.4H$_2$O)

magnesium fluoride (MgF$_2$), and thallium trifluoride (TlF$_3$). The foregoing list is not to be considered as limiting but merely representative of the inorganic fluoride adsorbent contemplated for use in the instant decolorizing process. Of the numerous metal fluorides tested, preference is accorded the water-insoluble alkaline earth fluorides, namely, the fluorides of calcium, barium, magnesium, and strontium. While many of the above recited fluorides are relatively expensive in initial cost in comparison to known decolorizers, such as clays, silica gel, and the like, nevertheless the efficient decolorization attained with present fluoride adsorbents, together with the fact that they may be readily regenerated with substantially complete recovery thereof, make them attractive from a commercial standpoint.

The conditions under which the instant process is carried out may vary widely, depending upon the nature of the oil stock undergoing treatment and the particular inorganic fluoride adsorbent employed. In general, however, the oil to be decolorized is contacted with finely divided adsorbent of powder size, having a comparatively large effective surface area of at least about 1 square meter per gram of solid for a sufficient period of time to effect substantial removal of color bodies contained therein. The duration of such contact is dependent upon the relative proportions of oil and the sorbent power of the particular adsorbent used. As a general rule, the larger the amount of adsorbent present, the shorter is the contact time required. Under the usual conditions of practicing the process of this invention, however, the contact period will generally range from about 2 to about 300 minutes. In order to bring about a more effective contact between the finely divided adsorbent and oil stock, the mixture is ordinarily agitated by stirring, shaking, or other means during the aforementioned period. Such treatments are effected at substantially atmospheric pressure and may be carried on at atmospheric or higher temperatures generally not exceeding about 200° C. The quantity of adsorbent employed may be of the order of from about 1% to about 50% or more by weight based on the quantity of oil treated, depending upon the nature of the oil to be treated and upon the qualities desired in the resulting decolorized product. The decolorized oil is thereafter separated from the spent fluoride particles by filtration, centrifuging, or other suitable means.

The adsorbent containing sorbed color bodies may then be regenerated by elutriation with an organic polar solvent. The solvents useful for this purpose should possess at least some mutual solubility with the oil undergoing treatment and should be sufficiently volatile to be completely separable from the oil by distillation at relatively low temperatures. The solvent employed should be polar in nature since the color bodies removed from the adsorbent therewith are polar. The reason for mutual solubility of solvent and oil resides in the necessity for the polar solvent to penetrate and work off layers of oil adhering to the fluoride adsorbent. The elutriation will generally be carried out at atmospheric temperatures, although in some instances slightly elevated temperatures not exceeding the boiling point of the particular solvent employed may be helpful in facilitating the removal of color bodies. In particular, it has been found that the lower alcohols and ketones may be used with advantage as elutriants for the sorbed coloring matter. Thus, ethyl, isopropyl, butyl, amyl, and iso-amyl alcohols and such ketones as acetone, methylethyl ketone, and methyl-isopropyl ketone may be used advantageously. These solvents, together with other polar solvents having the above-defined characteristics, may be used either alone or in combination to provide an effective elutriant medium for regenerating the spent adsorbent by removing sorbed color bodies therefrom.

The adsorbent thus regenerated may be used for further contact decolorization after being dried. The solvent solution containing the coloring matter previously removed is treated to effect recovery of the solvent. Such treatment ordinarily involves fractionating the solution of coloring matter driving the solvent therefrom as overhead and obtaining the coloring bodies as residue. Solvent vapor, removed as overhead, is condensed and may then, if desired, be used for further elutriation of the spent adsorbent.

The process described above is conveniently adaptable to continuous operation and a suitable system for carrying out such operation is shown in the attached drawing. Referring more particularly to the drawing, it will be seen that the oil charge to be treated is conducted into mixing tank 1 through conduit 2. The inorganic fluoride adsorbent is led into the mixing tank via conduit 3. The tank is provided with a propellor agitator 4 which serves to intimately admix the oil and adsorbent. After thorough admixture has been attained, the resulting oil-adsorbent slurry is conducted through outlet pipe 5 provided with control valve 6 into filter vessel 7. There, the decolorized oil is separated from the adsorbent by passing through a slanted filter plate 8 and is removed from filter vessel 7 by means of pipe 9. The spent adsorbent collecting on filter plate 8 moves by gravity through conduit 10, the flow being suitably controlled by valve 11, and passes into tower 12. Polar solvent introduced into tower 12 through pipes 13 and 14 flows through the spent adsorbent contained in the tower and resting on slanted filter plate 15. The solvent in flowing through the bed of adsorbent removes sorbed color bodies therefrom. A stream of solvent containing the color bodies so removed is conducted from the bottom of tower 12 through outlet conduit 16 and is led into fractionating column 17. The column is maintained at a temperature such that the solvent passes overhead as vapor through pipe 18 while the coloring matter previously removed from the oil and the adsorbent collects in the bottom of column 17 and is periodically removed therefrom through pipe 19. The solvent vapor flowing through pipe 18 passes through condenser 20 wherein the solvent vapor is condensed. Liquid solvent ensuing from condenser 20 is recycled to tower 12 through pipe 14.

The adsorbent so regenerated in tower 12 moves by gravity from filter plate 15 through conduit 21, the rate of flow being controlled by valve 22 and passes into drier 23. Solvent adhering to the adsorbent is driven off in the drier and passes overhead as a vapor through pipe 24 to condenser 20. The dried regenerated adsorbent passes from the bottom of drier 23, the rate of passage being suitably controlled by valve 25. The dried adsorbent then flows through conduit 26 where it is picked up by belt conveyor 27 and carried to storage bin 28. From bin 28, the adsorbent may be recycled through conduit 29 to tank 1, the rate of flow being suitably regulated by control valve 30.

Having described the nature of this invention, the following specific, but non-limiting, examples will serve to illustrate the improved results attained in accordance with the instant process:

*Example 1*

A solvent-refined Oklahoma City distillate having a color (Lovibond) of 7.2 was contacted with lithium fluoride powder. The solid weight-to-oil-volume ratio was 0.2 gram solid per cubic centimeter of oil stock. The contact was effected at a temperature of 22° C. and for a period of 5 minutes. The oil, after removal from the adsorbent by filtration, was found to have a color (Lovibond) of 1.85.

Example 2

A solvent-refined Oklahoma City distillate having a color (Lovibond) of 7.2 was contacted with finely divided barium fluoride. The solid weight-to-oil-volume ratio was 0.2 gram solid per cubic centimeter of oil stock. The contact was effected at a temperature of 22° C. and for a period of 5 minutes. The oil, after removal from the adsorbent by filtration, was found to have a color (Lovibond) of 1.85.

Example 3

A solvent-refined Oklahoma City distillate having a color (Lovibond) of 7.2 was contacted with finely divided calcium fluoride. The solid weight-to-oil-volume ratio was 0.2 gram solid per cubic centimeter of oil stock. The contact was effected at a temperature of 22° C. and for a period of 5 minutes. The oil, after removal from the adsorbent by filtration, was found to have a color (Lovibond) of 1.3.

From the foregoing examples, it will be seen that the solid water-insoluble inorganic metal fluorides in finely divided form possess high color sorptive capacity for removing color bodies from mineral oils.

The process of this invention has been found to be particularly valuable in improving the color of Mid-Continent and Coastal petroleum stocks but may be applied in improving the color of oils from practically any source, for example, untreated petroleum distillates or residuums and treated oils, clay-treated oils, solvent-treated oils, oils produced by hydrogenation, oils produced by cracking, and oils produced by various synthetic or polymerization methods.

It is, accordingly, to be understood that the above description is merely illustrative of preferred embodiments of the invention of which many variations may be made within the scope of the following claims by those skilled in the art without departing from the spirit thereof.

I claim:

1. A continuous process for removing color bodies from a petroleum lubricating oil containing the same, which comprises contacting said oil with a solid water-insoluble inorganic metal fluoride, filtering the decolorized oil from said fluoride, elutriating the spent fluoride with a polar solvent, drying the fluoride so regenerated, recycling the regenerated fluoride to further contact with the original oil, separating the solvent solution of color bodies and recycling said separated solvent to contact with the aforesaid spent fluoride.

2. A continuous process for removing color bodies from a petroleum lubricating oil containing the same, which comprises contacting said oil with a water-insoluble alkaline earth metal fluoride, filtering the decolorized oil from said fluoride, elutriating the spent fluoride with a polar solvent, drying the fluoride so regenerated, recycling the regenerated fluoride to further contact with the original oil, separating the solvent solution of color bodies and recycling said separated solvent to contact with the aforesaid spent fluoride.

3. A continuous process for removing color bodies from a petroleum lubricating oil containing the same, which comprises contacting said oil with barium fluoride, filtering the decolorized oil from said fluoride, elutriating the spent fluoride with a polar solvent, drying the fluoride so regenerated, recycling the regenerated fluoride to further contact with the original oil, separating the solvent solution of color bodies and recycling said separated solvent to contact with the aforesaid spent fluoride.

4. A continuous process for removing color bodies from a petroleum lubricating oil containing the same, which comprises contacting said oil with calcium fluoride, filtering the decolorized oil from said fluoride, elutriating the spent fluoride with a polar solvent, drying the fluoride so regenerated, recycling the regenerated fluoride to further contact with the original oil, separating the solvent solution of color bodies and recycling said separated solvent to contact with the aforesaid spent fluoride.

5. A continuous process for removing color bodies from a petroleum lubricating oil containing the same, which comprises contacting said oil with lithium fluoride, filtering the decolorized oil from said fluoride, elutriating the spent fluoride with a polar solvent, drying the fluoride so regenerated, recycling the regenerated fluoride to further contact with the original oil, separating the solvent solution of color bodies and recycling said separated solvent to contact with the aforesaid spent fluoride.

6. A method for removing color bodies from a petroleum lubricating oil containing the same which comprises contacting said oil with a solid water-insoluble inorganic metal fluoride, separating the oil so treated from said fluoride and regenerating the spent fluoride for further contact with untreated oil by elutriation thereof with an organic polar solvent.

7. A method for removing color bodies from a petroleum lubricating oil containing the same which comprises contacting said oil with a water-insoluble alkaline earth metal fluoride, separating the oil so treated from said fluoride and regenerating the spent fluoride for further contact with untreated oil by elutriation thereof with an organic polar solvent.

8. A method for removing color bodies from a petroleum lubricating oil containing the same which comprises contacting said oil with barium fluoride, separating the oil so treated from said fluoride and regenerating the spent fluoride for further contact with untreated oil by elutriation thereof with an organic polar solvent.

9. A method for removing color bodies from a petroleum lubricating oil containing the same which comprises contacting said oil with calcium fluoride, separating the oil so treated from said fluoride and regenerating the spent fluoride for further contact with untreated oil by elutriation thereof with an organic polar solvent.

10. A method for removing color bodies from a petroleum lubricating oil containing the same which comprises contacting said oil with lithium fluoride, separating the oil so treated from said fluoride and regenerating the spent fluoride for further contact with untreated oil by elutriation thereof with an organic polar solvent.

PAUL B. WEISZ.

References Cited in the file of this patent

UNITED STATES PATENTS

| Number | Name | Date |
|---|---|---|
| 2,333,648 | Grosse et al. | Nov. 9, 1943 |
| 2,333,649 | Grosse et al. | Nov. 9, 1943 |
| 2,335,006 | Giraitis | Nov. 23, 1943 |
| 2,341,567 | Moriarity | Feb. 15, 1944 |
| 2,413,868 | Frey | Jan. 7, 1947 |
| 2,459,434 | Kanhofer | Jan. 18, 1949 |
| 2,463,077 | Zimmerman et al. | Mar. 1, 1949 |